United States Patent
Shi et al.

(10) Patent No.: US 9,829,641 B2
(45) Date of Patent: Nov. 28, 2017

(54) INTEGRATED LENS-ARRAY-ON-SUBSTRATE FOR OPTICAL COUPLING SYSTEM AND FABRICATION METHOD THEREOF

(71) Applicant: SiFotonics Technologies Co., Ltd., Grand Cayman (KY)

(72) Inventors: Tuo Shi, Beijing (CN); Shipeng Yan, Beijing (CN); Nai Zhang, Fremont, CA (US); Dong Pan, Andover, MA (US)

(73) Assignee: SiFotonics Technologies Co, Ltd., Grand Cayman (KY)

( * ) Notice: Subject to any disclaimer, the term of this patent is extended or adjusted under 35 U.S.C. 154(b) by 0 days.

(21) Appl. No.: 15/259,296

(22) Filed: Sep. 8, 2016

(65) Prior Publication Data

US 2017/0023739 A1 Jan. 26, 2017

Related U.S. Application Data

(62) Division of application No. 14/807,880, filed on Jul. 23, 2015, now Pat. No. 9,465,175.

(Continued)

(51) Int. Cl.
| | |
|---|---|
| *G02B 6/34* | (2006.01) |
| *G02B 6/32* | (2006.01) |
| *G02B 6/42* | (2006.01) |
| *G02B 6/12* | (2006.01) |
| *G02B 5/04* | (2006.01) |
| *G02B 6/293* | (2006.01) |
| *G02B 27/10* | (2006.01) |

(52) U.S. Cl.
CPC ............. *G02B 6/32* (2013.01); *G02B 5/04* (2013.01); *G02B 6/12019* (2013.01); *G02B 6/29367* (2013.01); *G02B 6/34* (2013.01); *G02B 6/4203* (2013.01); *G02B 6/4208* (2013.01); *G02B 6/4214* (2013.01); *G02B 6/4215* (2013.01); *G02B 6/4249* (2013.01); *G02B 6/4255* (2013.01); *G02B 6/4257* (2013.01); *G02B 6/4295* (2013.01); *G02B 27/1006* (2013.01)

(58) Field of Classification Search
CPC .... G02B 5/04; G02B 27/1006; G02B 6/4215; G02B 6/12019; G02B 6/4295; G02B 6/4214; G02B 6/4257; G02B 6/29367; G02B 6/32; G02B 6/4208; G02B 6/4249; G02B 6/4255; G02B 6/341; G02B 6/4203
See application file for complete search history.

(56) References Cited

U.S. PATENT DOCUMENTS

| | | | | | |
|---|---|---|---|---|---|
| 5,321,503 | A | * | 6/1994 | Bramson | G01C 19/726 356/464 |
| 6,027,255 | A | * | 2/2000 | Joo | G02B 6/4212 385/88 |

(Continued)

*Primary Examiner* — Akm Enayet Ullah
(74) *Attorney, Agent, or Firm* — Han IP Corporation; Andy M. Han

(57) ABSTRACT

An integrated optical coupling device may include a substrate, a coating layer disposed on the substrate, and a prism disposed on the coating layer. The prism may include a first surface and a second surface. The integrated optical coupling device may also include a first lens disposed on the first surface of the prism, a second lens disposed on the second surface of the prism, and an anti-reflection coating layer disposed on the first lens and the second lens.

13 Claims, 14 Drawing Sheets

Related U.S. Application Data

(60) Provisional application No. 61/999,317, filed on Jul. 23, 2014.

(56) References Cited

U.S. PATENT DOCUMENTS

| | | | | |
|---|---|---|---|---|
| 6,869,479 B2* | 3/2005 | Shafeev | ............... | G02B 6/13 117/58 |
| 2007/0297719 A1* | 12/2007 | Nathan | ............... | G02B 3/0056 385/32 |
| 2011/0165652 A1* | 7/2011 | Hardin | ............... | C07H 19/10 435/194 |
| 2016/0084761 A1* | 3/2016 | Rothberg | ............ | C12Q 1/6874 506/4 |

* cited by examiner

INTEGRATED LENS-ARRAY-ON-SUBSTRATE FOR OPTICAL COUPLING SYSTEM AND FABRICATION METHOD THEREOF

CROSS-REFERENCE TO RELATED PATENT APPLICATION(S)

The present disclosure is a divisional of U.S. patent application Ser. No. 14/807,880, filed on Jul. 23, 2015 and claiming the priority benefit of U.S. Patent Application No. 61/999,317, filed on Jul. 23, 2014. The aforementioned applications are incorporated by reference in their entirety.

TECHNICAL FIELD

The present disclosure is related to integrated optical coupling devices. More particularly, the present disclosure is related to integrated lens-array-on-substrate for optical coupling and fabrication thereof.

BACKGROUND

The infrastructure of a typical data center is being challenged by the burgeoning growth of cloud computing and mobile internet data usage. Data centers all over the world are transforming the network architectures and fiber network systems to keep place with current needs and future-proof networks to meet higher network capacity. Besides the shift of the network architecture, a major significant transformation is the upgrade of data speeds across the network. For switch-to-switch connections, 10 Gb/s connection links are replaced by 40 Gb/s and 100 Gb/s systems, based on wavelength division multiplexing (WDM) technologies which utilize four wavelength light for transmission signals in parallel. Furthermore, the number of servers and floor space also increase to an unprecedented scale. The footprint, cost and power consumption of optical modules become a significant factor. Thus, integrated multiplexing/de-multiplexing (Mux/DeMux) components are required for module packaging to combine lights of four wavelengths into one output beam at the transmitter port or to separate four-wavelength signals out of a mixed beam at a receiver port.

A conventional coupling lens for Mux/DeMux is illustrated in Error! Reference source not found.3, formed by adhering two lenses and one right-angle prism together. The glass lens 1 and glass lens 2 are fabricated by high-temperature molding, and the right-angle prism is fabricated by polishing lens. As such, the fabrication procedures of these components are cost ineffective. Error! Reference source not found. shows the coupling function of an optical coupling device. The output port of the waveguide is fixed at the focus point of glass lens 1, which turns the incoming light into parallel light. A parallel light is then reflected toward glass lens 2, and is focused by glass lens 2 at the focus point, where a photodiode is placed. The optical system requires that all the optical components to be placed exactly in the designed optical path; otherwise the coupling efficiency from waveguide to the photodiode is low. The fabrication procedure of a conventional coupling lens based on glue-bonding confines the alignment precision, or otherwise the fabrication cost is high.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, an integrated optical coupling device may include a substrate, a coating layer disposed on the substrate, and a prism disposed on the coating layer. The prism may include a first surface and a second surface. The integrated optical coupling device may also include a first lens disposed on the first surface of the prism, a second lens disposed on the second surface of the prism, and an anti-reflection coating layer disposed on the first lens and the second lens.

In one aspect, an imprinting method for forming an integrated optical coupling device on wafer level may include: providing a substrate, with a reflection coating disposed thereon; providing an imprinting mold, with void regions shaped according to a designed lens profile; forming a molding material on the substrate; pressing the imprinting mold on the molding material on the substrate; curing the molding material; removing the imprinting mold; depositing an anti-reflection film on the cured molding material; and dicing to form an integrated optical coupling device.

In one aspect, an integrated optical coupling device may include a double-polished substrate having a first polished surface and a second polished surface opposite the first polished surface, a first coating layer disposed on the first polished surface of the substrate, and a first prism disposed on the first coating layer. The first prism may include a first surface and a second surface. The integrated optical coupling device may also include a first lens disposed on the first surface of the first prism, a second lens disposed on the second surface of the first prism, a first anti-reflection coating layer disposed on the first lens and the second lens, a second coating layer disposed on the second polished surface of the substrate, and a second prism disposed on the second coating layer. The second prism may include a first surface and a second surface. The integrated optical coupling device may further include a third lens disposed on the first surface of the second prism, a fourth lens disposed on the second surface of the second prism, and a second anti-reflection coating layer disposed on the third lens and the fourth lens.

In one aspect, an imprinting method for forming an integrated optical coupling device on wafer level may include: providing a double-polished substrate, the double-polished substrate having a first surface and a second surface opposite the first surface; forming a partial-transparent partial-reflecting layer on the first surface of the substrate; forming an anti-reflection layer on the second surface of the substrate; providing a first imprinting mold with voids regions shaped according to a designed lens profile; providing a second imprinting mold with void regions shaped according to the designed lens profile; forming a first molding material on the first polished surface of the substrate with the partial-transparent partial reflecting layer; pressing the first imprinting mold on the first molding material on the substrate; curing the first molding material; removing the first imprint mold; depositing a first anti-reflection film on the cured first molding material; flipping the substrate; forming a second molding material on the second surface of the substrate with the anti-reflection layer; pressing the second imprinting mold on the second molding material on the substrate; curing the second molding material; removing the second imprinting mold; depositing a second anti-reflection film on the cured second molding material; and dicing to form an integrated optical coupling device.

In one aspect, an integrated optical Mux/DeMux device may include a double-polished substrate, an anti-reflection film, a first filter, a second filter, a third filter, and a fourth filter. The first filter may be a band-pass multilayer coating film for a first wavelength. The second filter may be a band-pass multilayer coating film for a second wavelength. The third filter may be a band-pass multilayer coating film for a third wavelength. The fourth filter may be a band-pass multilayer coating film for a fourth wavelength. The integrated optical Mux/DeMux device may also include a first lens disposed on the first filter, a second lens disposed on the second filter, a third lens disposed on the third filter, and a fourth lens disposed on the fourth filter.

In one aspect, an integrated optical Mux/DeMux device may include a first substrate layer, a second substrate layer, a third substrate layer, a fourth substrate layer, and an anti-reflection layer disposed on a top surface of the first substrate layer. The first substrate layer may be a double-polished substrate. The second substrate layer may be a double-polished substrate. The third substrate layer may be a double-polished substrate. The fourth substrate layer may be a double-polished substrate. The integrated optical Mux/DeMux device may also include a first filter, a second filter, a third filter, a fourth filter, and a lens array. The first filter may be a band-reflection multilayer coating film for a first wavelength, disposed between the first substrate layer and the second substrate layer. The second filter may be a band-reflection multilayer coating film for a second wavelength, disposed between the second substrate layer and the third substrate layer. The third filter may be a band-reflection multilayer coating film for a third wavelength, disposed between the third substrate layer and the fourth substrate layer. The fourth filter may be a band-reflection multilayer coating film for a fourth wavelength, disposed on a bottom surface of the fourth substrate layer. The lens array may be disposed on the anti-reflection layer.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. The drawings may not necessarily be in scale so as to better present certain features of the illustrated subject matter.

DETAILED DESCRIPTION OF THE PREFERRED EMBODIMENTS

Figure 1:
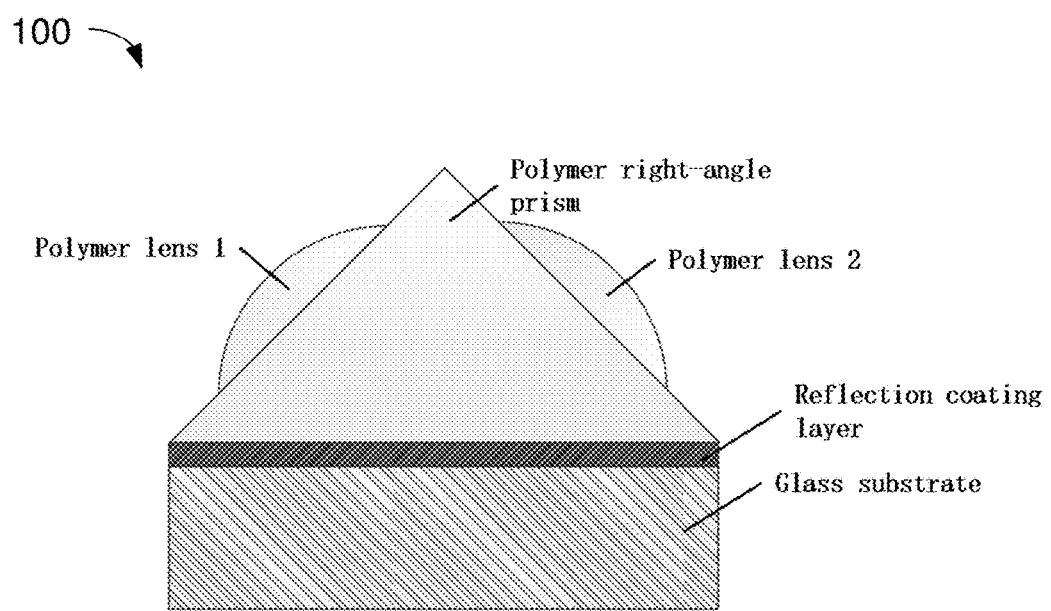
FIG. 1 is a diagram of a novel integrated lens-on-substrate optical coupling device for waveguide/fiber to photodiode coupling in accordance with the present disclosure.

The present disclosure provides an integrated lens-on-substrate device based on wafer-level nano-imprinting technology. Advantages of wafer-level nano-imprinting technology include, but are not limited to, cost effectiveness, high precision, mass production uniformity, and high yield. FIG. 1 illustrates a novel integrated lens-on-substrate optical coupling device 100 for waveguide/fiber to photodiode coupling in accordance with the present disclosure. The substrate of optical coupling device 100 may be, for example, a glass substrate. The prism and two lenses on two surfaces of the prism may be made of polymer by nano-imprinting technology.

Figure 2:
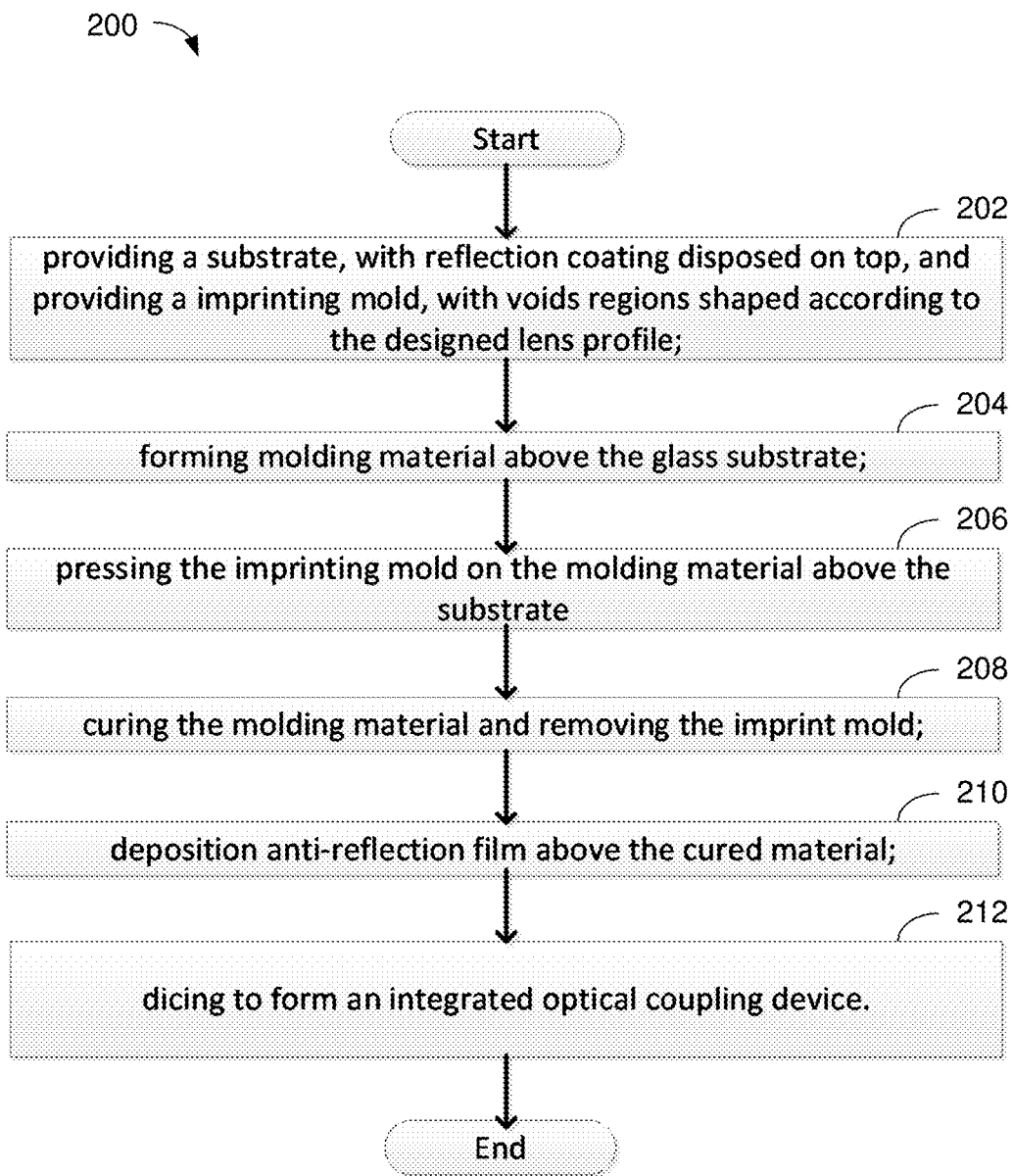
FIG. 2 is a flowchart of a fabrication process for an integrated lens-on-substrate optical coupling device with wafer-level imprinting technology in accordance with the present disclosure.

FIG. 2 illustrates a fabrication process 200 for an integrated lens-on-substrate optical coupling device (e.g., optical coupling device 100) with wafer-level imprinting technology in accordance with the present disclosure. Fabrication process 200 may be utilized to fabricate the optical coupling device 100 of FIG. 1. Fabrication process 200 may include a number of operations including, but not limited to, those shown in FIG. 2. Although operations 202-212 in FIG. 2 are shown in a particular order, in various embodiments some of the operations 202-212 may be implemented in orders different from that shown in FIG. 2. Moreover, some of the operations 202-212 may be implemented in parallel and not necessarily in series as shown in FIG. 2. For illustrative purpose, the following description of fabrication process 200 refers to optical coupling device 100 of FIG. 1.

At 202, a substrate is provided with reflection coating disposed on top, and an imprinting mold is provided with voids regions shaped according to a designed lens profile.

At 204, a molding material is formed on or above the substrate, which may be a glass substrate.

At 206, the imprinting mold is pressed on the molding material on/above the substrate.

At 208, the molding material is cured and removed.

At 210, an anti-reflection film is deposited on or above the cured material.

At 212, the structure thus formed is diced to form an integrated optical coupling device, e.g., optical coupling device 100.

Figure 3:
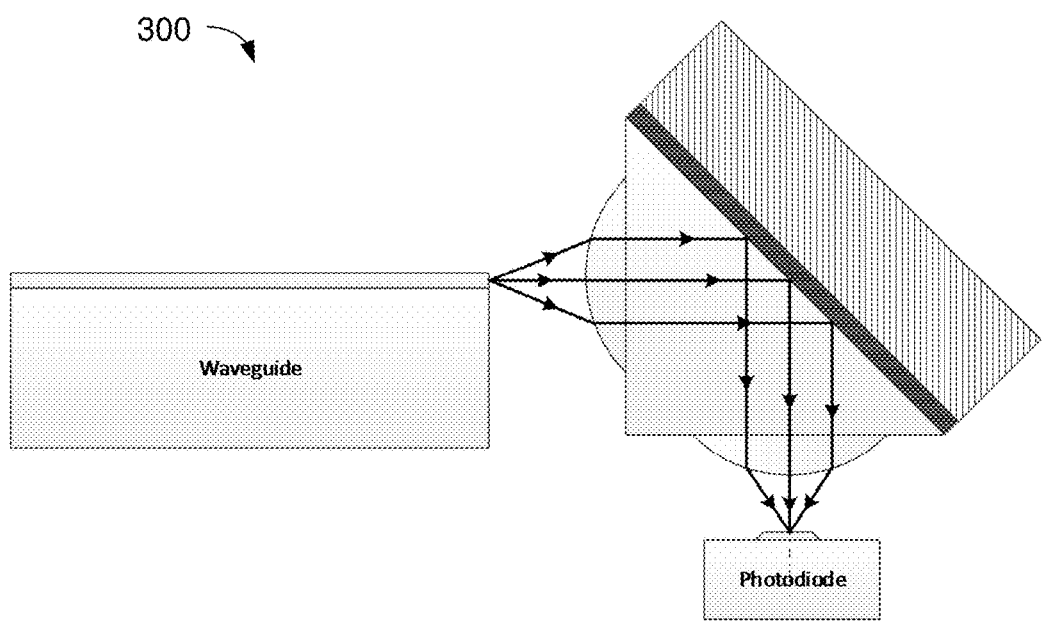
FIG. 3 is a schematic diagram of a coupling system utilizing an integrated lens-on-substrate optical coupling device in accordance with the present disclosure.

FIG. 3 illustrates a coupling system 300 utilizing an integrated lens-on-substrate optical coupling device in accordance with the present disclosure. Referring to FIG. 3, the divergent output beam from a waveguide or a fiber is converged to parallel beam by the first lens on the prism, and it is then reflected by the prism, and the parallel beam is finally converged on the photodiode aperture by the second lens.

Figure 4:
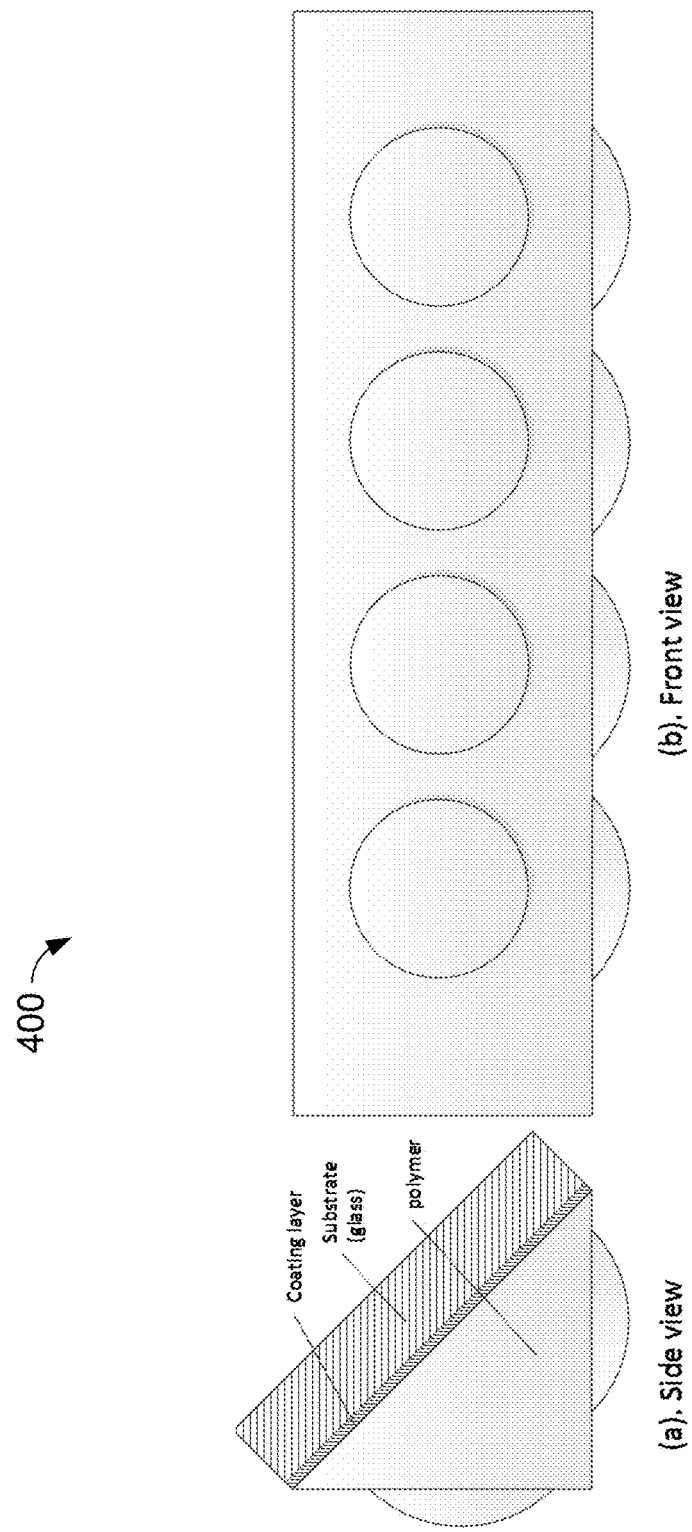
FIG. 4 is a diagram of a novel integrated lens-array-on-substrate optical coupling device for waveguide/fiber to photodiode coupling in accordance with the present disclosure.
Figure 5:
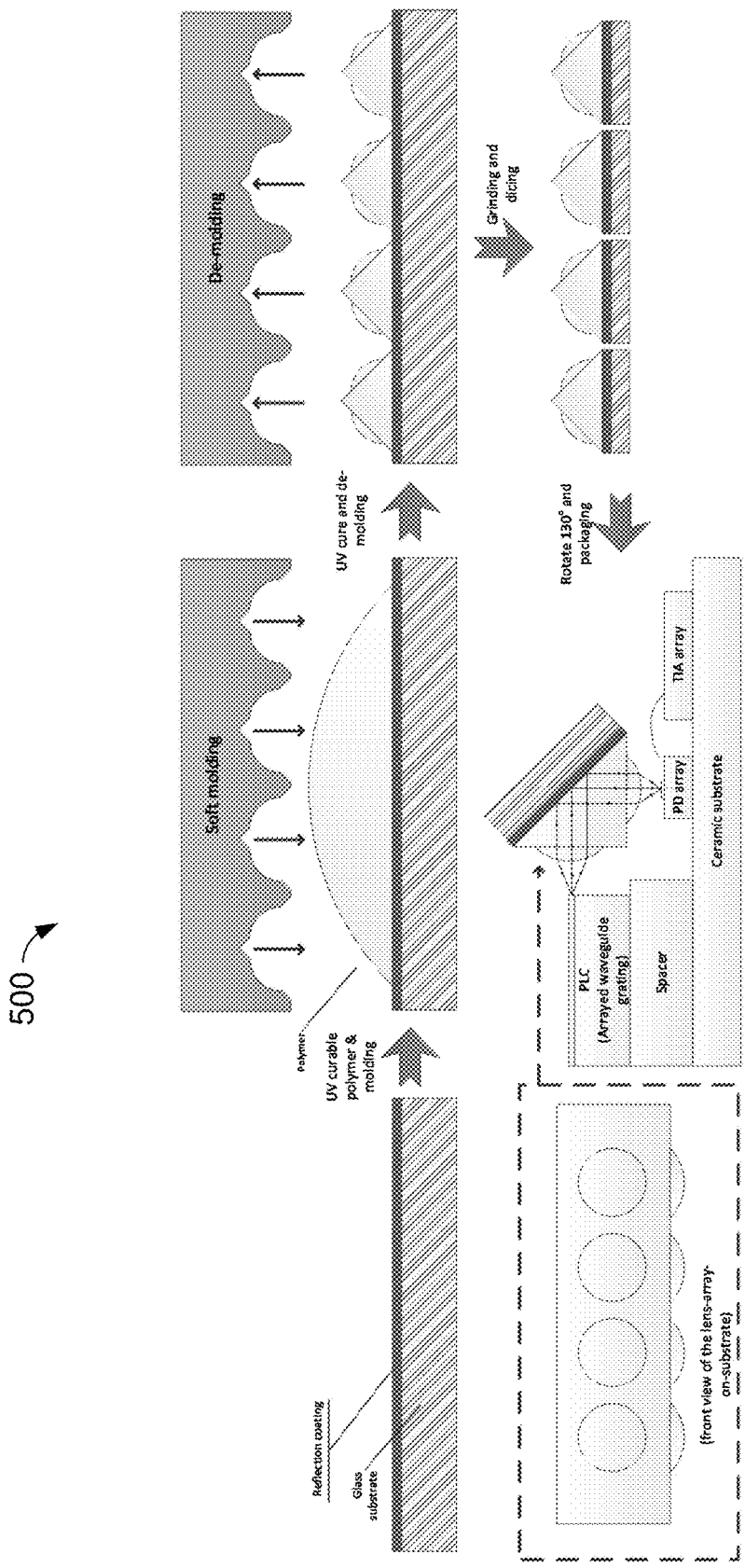
FIG. 5 is a schematic diagram of a fabrication procedure for a lens-array-on-substrate optical coupling device based on wafer-level imprinting technology in accordance with the present disclosure.

FIG. 4 is a diagram of a novel integrated lens-array-on-substrate optical coupling device 400 based on wafer-level nano-imprinting technology for waveguide/fiber to photodiode coupling in accordance with the present disclosure. With wafer-level imprinting technology, it is achievable to fabricate arrays of any size with any pitch, while the fabrication precision of the lens surface and lens position is very high. FIG. 5 illustrates a fabrication procedure 500 for a lens-array-on-substrate optical coupling device (e.g., optical coupling device 400) based on wafer-level imprinting technology in accordance with the present disclosure.

Figure 6:
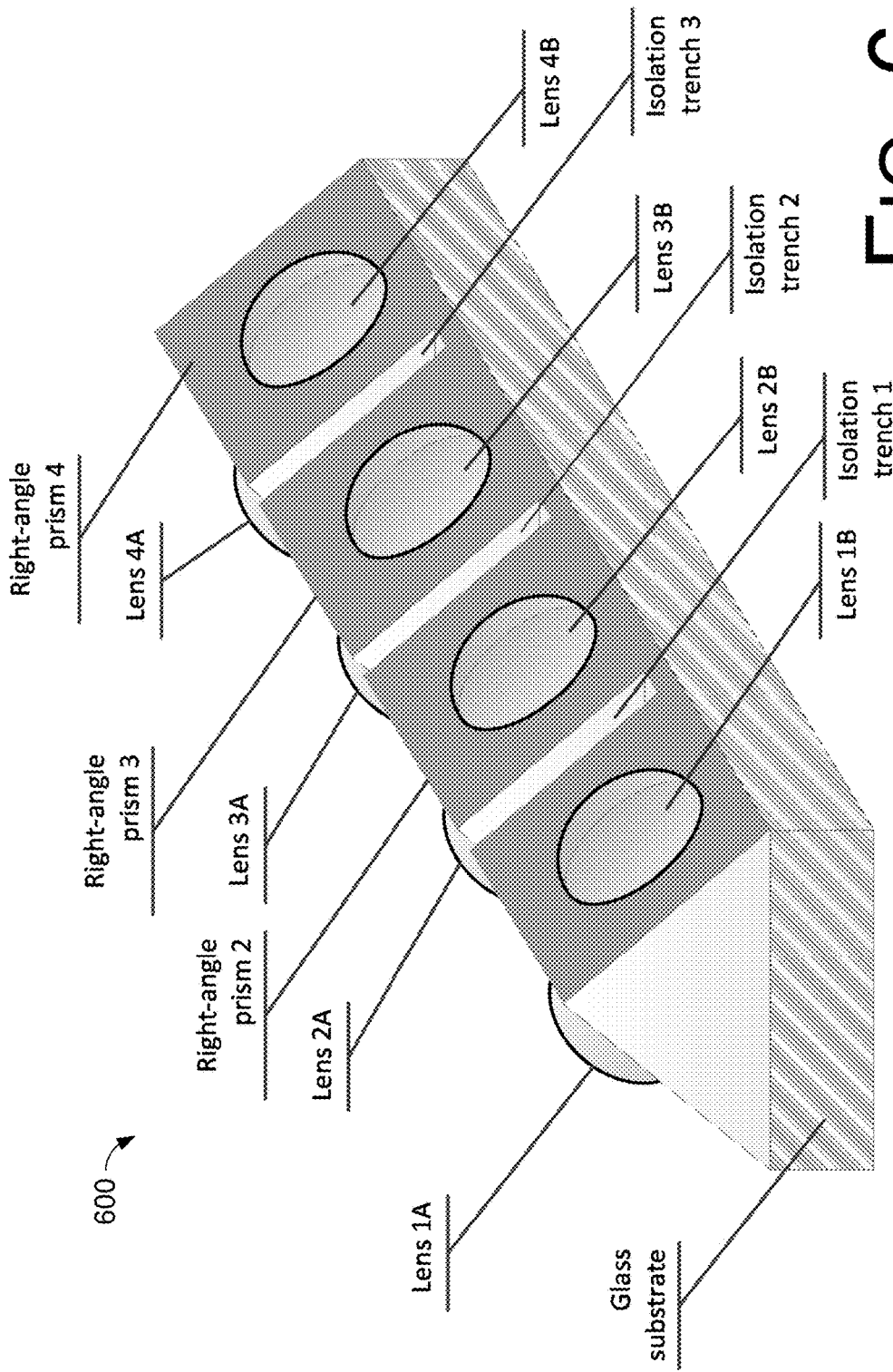
FIG. 6 is a diagram of a novel integrated lens-array-on-substrate device for waveguide/fiber to photodiode coupling, with nano-imprinted isolation trenches, in accordance with the present disclosure.

FIG. 6 illustrates a novel integrated lens-array-on-substrate device 600 for waveguide/fiber to photodiode coupling, with nano-imprinted isolation trenches, in accordance with the present disclosure. The integrated lens-array-on-substrate device 600 may include isolation trenches between adjacent lenses, which may be formed directly by wafer-level nano-imprinting technology.

Figure 7:
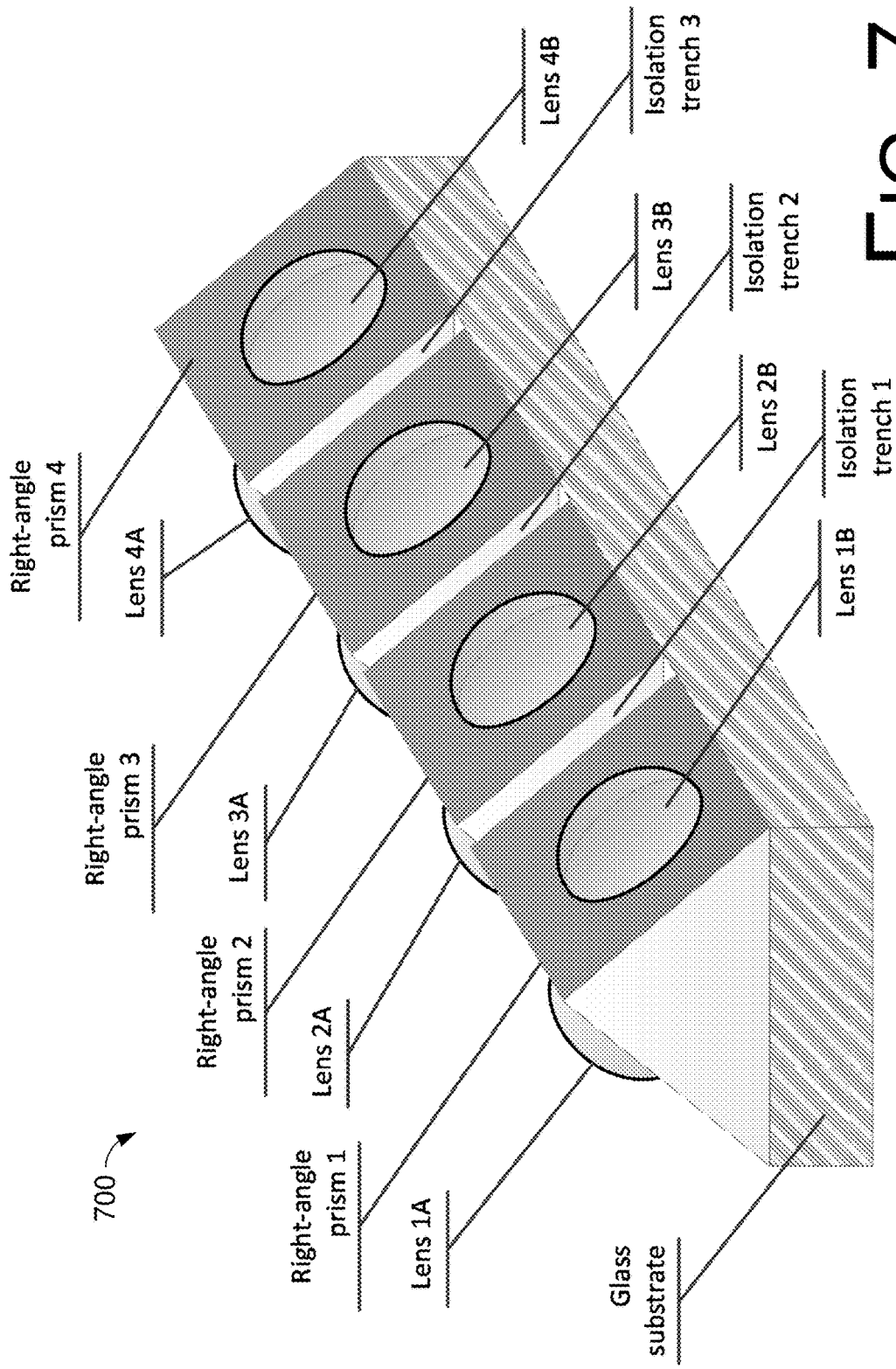
FIG. 7 is a diagram of a novel integrated lens-array-on-substrate device for waveguide/fiber to photodiode coupling, with isolation trenches formed by dry-etching process, in accordance with the present disclosure.

FIG. 7 illustrates a novel integrated lens-array-on-substrate device 700 for waveguide/fiber to photodiode coupling, with isolation trenches formed by dry-etching process, in accordance with the present disclosure. The integrated lens-array-on-substrate device may include isolation trenches between adjacent lenses, which may be formed by dry-etching process. With isolation trenches between the lenses, the lenses are separated. Advantageously, as a result, thermal expansion influences on device 700 are thus minimized.

Figure 8:
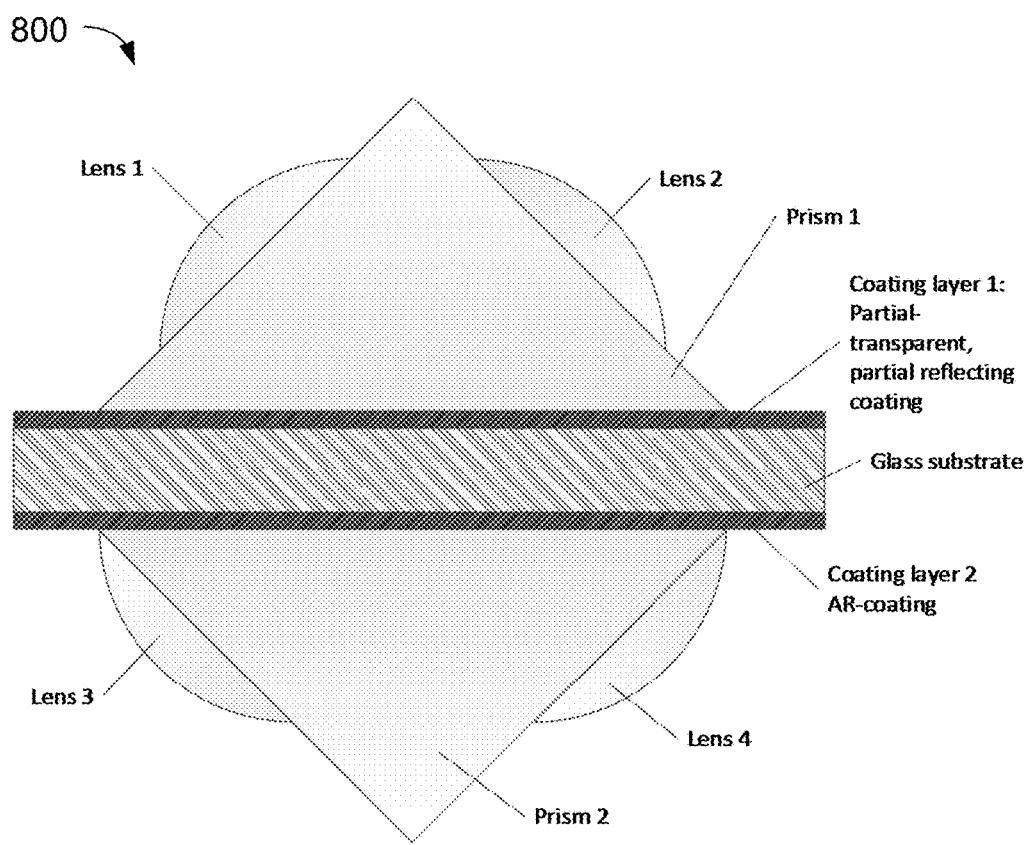
FIG. 8 is a diagram of an integrated lens-on-substrate triplexer device based on wafer-level imprinting technology in accordance with the present disclosure.

FIG. 8 illustrates an integrated lens-on-substrate triplexer device 800 based on wafer-level imprinting technology in accordance with the present disclosure. The integrated lens-on-substrate triplexer device may be configured for optical coupling of three components.

Figure 9:
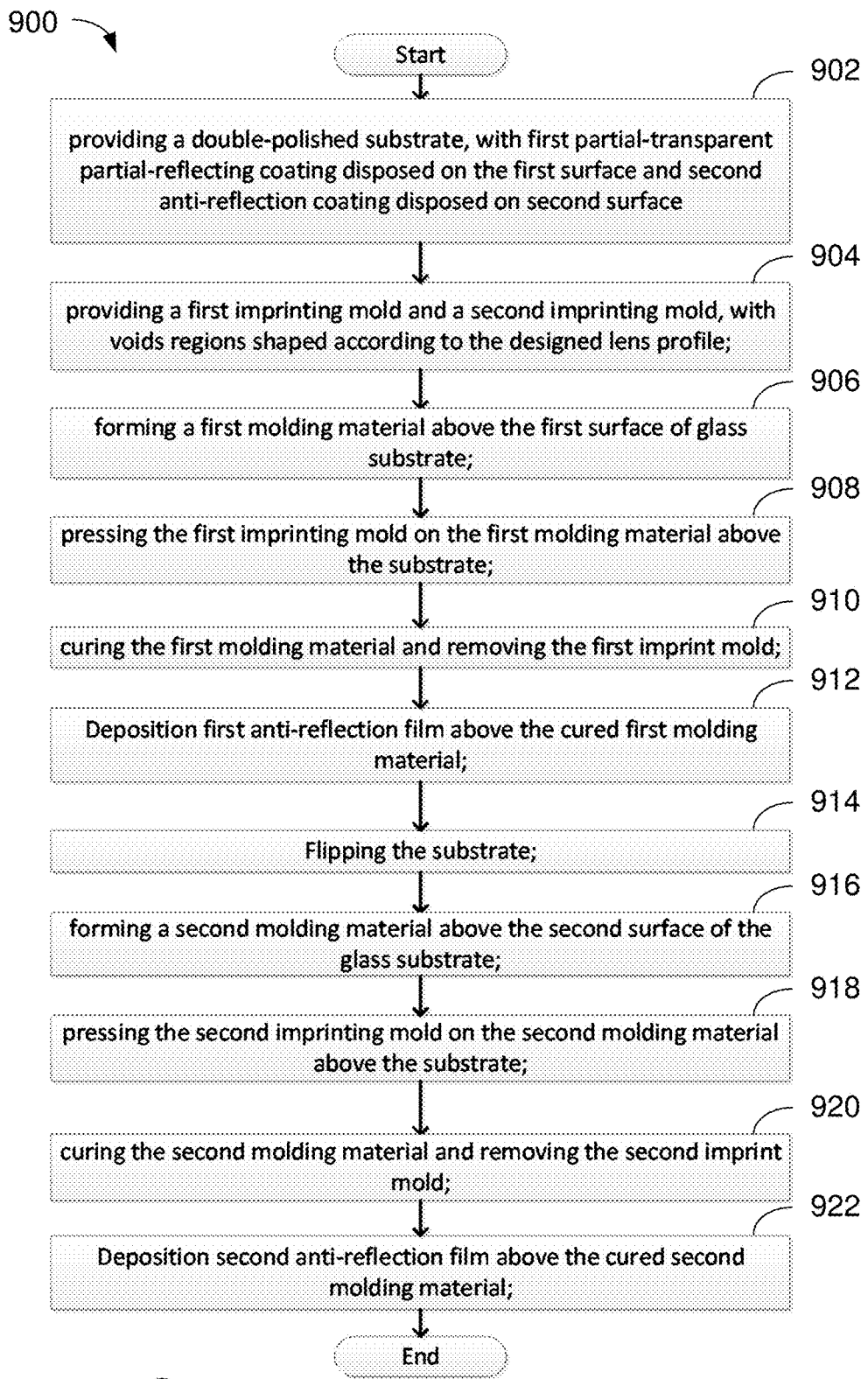
FIG. 9 is a flowchart of a fabrication process for an integrated lens-on-substrate triplexer device based on wafer-level imprinting technology in accordance with the present disclosure.

FIG. 9 illustrates a fabrication process 900 for an integrated lens-on-substrate triplexer device (e.g., triplexer device 800) based on wafer-level imprinting technology in accordance with the present disclosure. Fabrication process 900 may be utilized to fabricate the triplexer device 800 of FIG. 8. Fabrication process 900 may include a number of operations including, but not limited to, those shown in FIG. 9. Although operations 902-922 in FIG. 9 are shown in a particular order, in various embodiments some of the operations 902-922 may be implemented in orders different from that shown in FIG. 9. Moreover, some of the operations 902-922 may be implemented in parallel and not necessarily in series as shown in FIG. 9. For illustrative purpose, the following description of fabrication process 900 refers to triplexer device 800 of FIG. 8.

At 902, a double-polished substrate, with first partial-transparent partial-reflecting coating, may be provided or otherwise disposed on a first surface of a substrate, and an anti-reflection coating may be disposed on a second surface of the substrate. The substrate may be a glass substrate.

At 904, a first imprinting mold and a second imprinting mold may be provided, each with voids regions shaped according to a designed lens profile.

At 906, a first molding material may be formed on or above the first surface of the substrate.

At 908, the first imprinting mold is pressed on the first molding material on/above the substrate.

At 910, the first molding material is cured and removed.

At 912, a first anti-reflection film may be deposited on or above the cured first molding material.

At 914, the substrate is flipped so that the side that was facing downward is now facing upward.

At 916, a second molding material is formed on or above the second surface of the substrate.

At 918, the second imprinting mold is pressed on the second molding material on/above the substrate.

At 920, the second molding material is cured and removed.

At 922, a second anti-reflection film is deposited on or above the cured second molding material.

Figure 10:
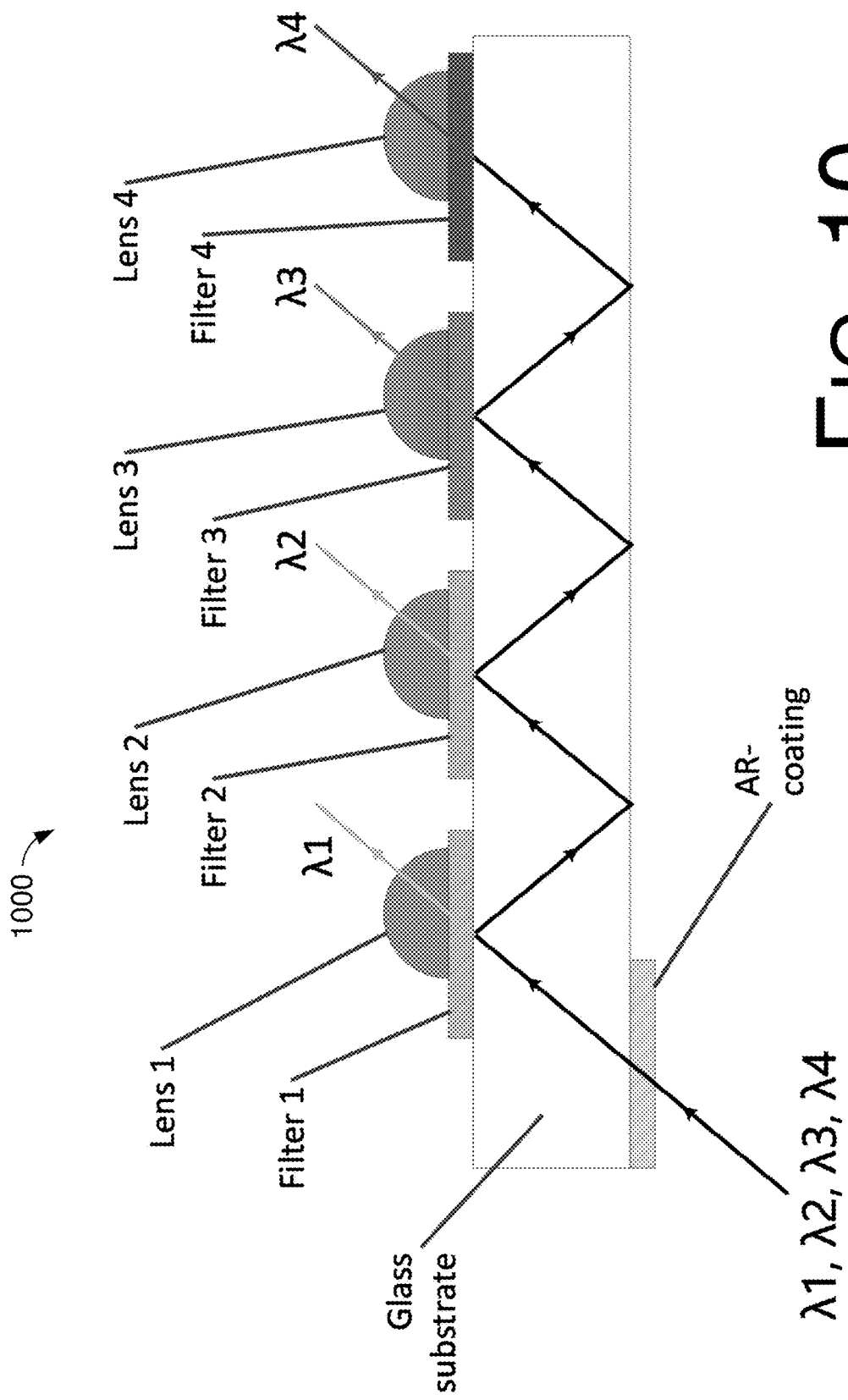
FIG. 10 is a diagram of a novel lens-integrated thin film filter for Mux/DeMux with input and output light on the opposite sides of the substrate in accordance with the present disclosure.

FIG. 10 illustrates a novel lens-integrated thin film filter 1000 for Mux/DeMux with input and output light on the opposite sides of the substrate in accordance with the present disclosure. Referring to FIG. 10, the input and output ports are designed at opposite sides of the substrate. The benefit of lens integration on thin film filters can significantly reduce the coupling complexity when packaging various functional components in one optical module. The four filters are designed for four different wavelengths with different film thicknesses. Each filter is fabricated through film deposition, lithography patterning and dry etch process, which are executed four times to fabricate the four filters. The input port may be coated with anti-reflection coating for all wavelengths.

Figure 11:
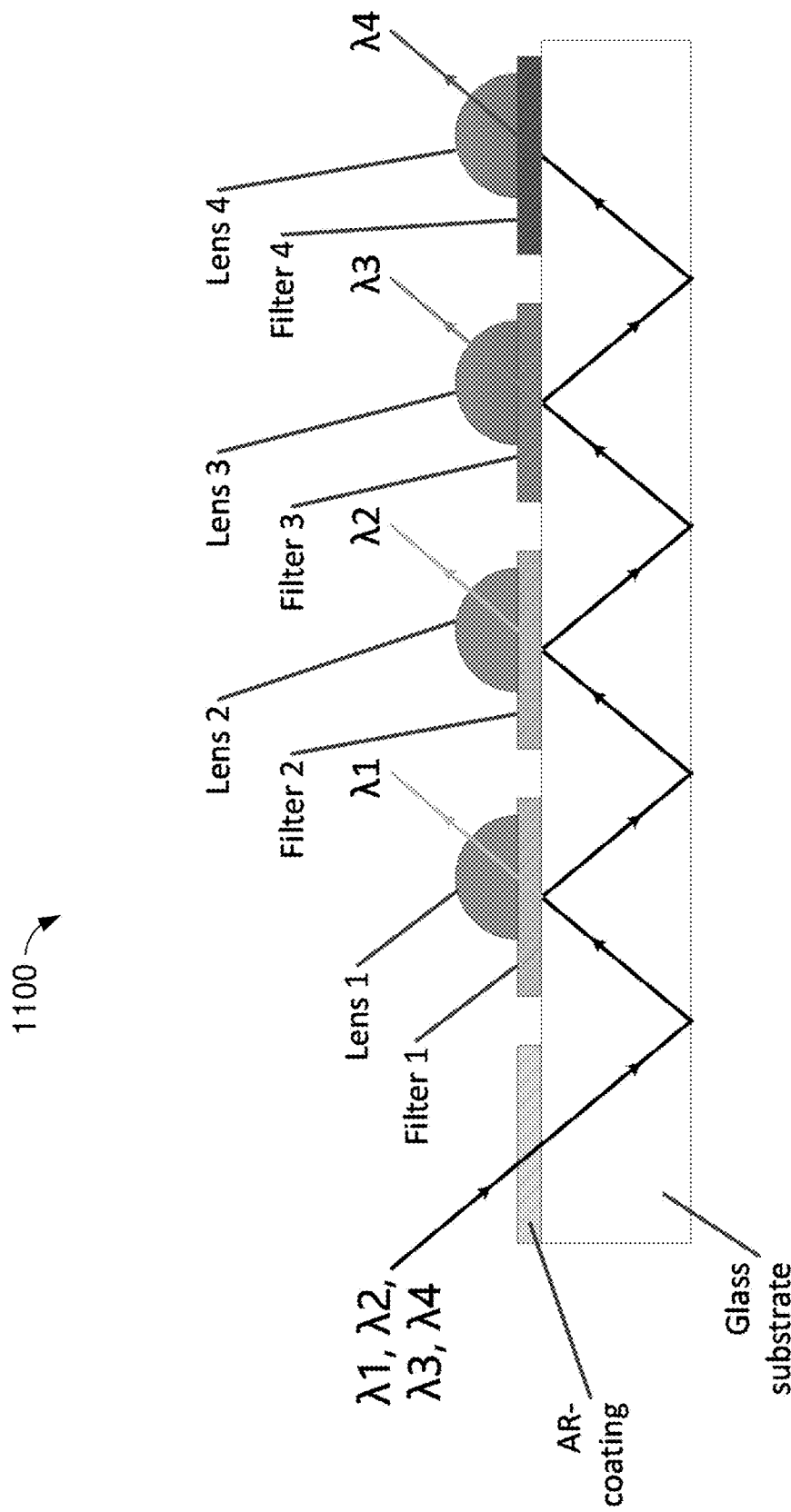
FIG. 11 is a diagram of a novel lens-integrated thin film filter for Mux/DeMux with input and output light on the same side of the substrate in accordance with the present disclosure.

FIG. 11 illustrates a novel lens-integrated thin film filter 1100 for Mux/DeMux with input and output light on the same side of the substrate in accordance with the present disclosure. Referring to FIG. 11, the input and output ports are designed at opposite sides of the substrate.

Figure 12:
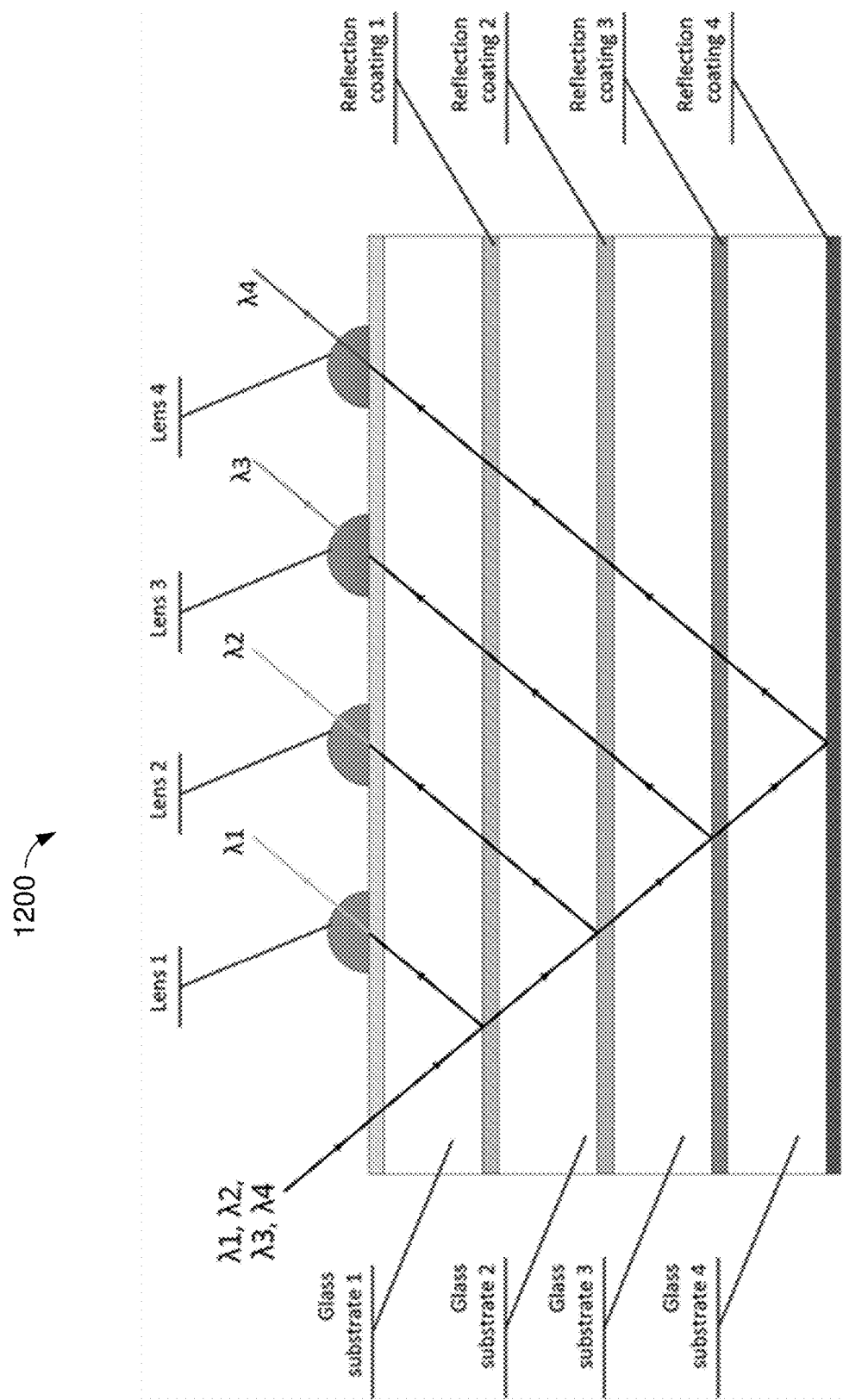
FIG. 12 is a diagram of a novel lens-integrated thin film filter for Mux/DeMux based on wafer-bonding technology and wafer-level nano-imprinting technology in accordance with the present disclosure.
Figure 13:
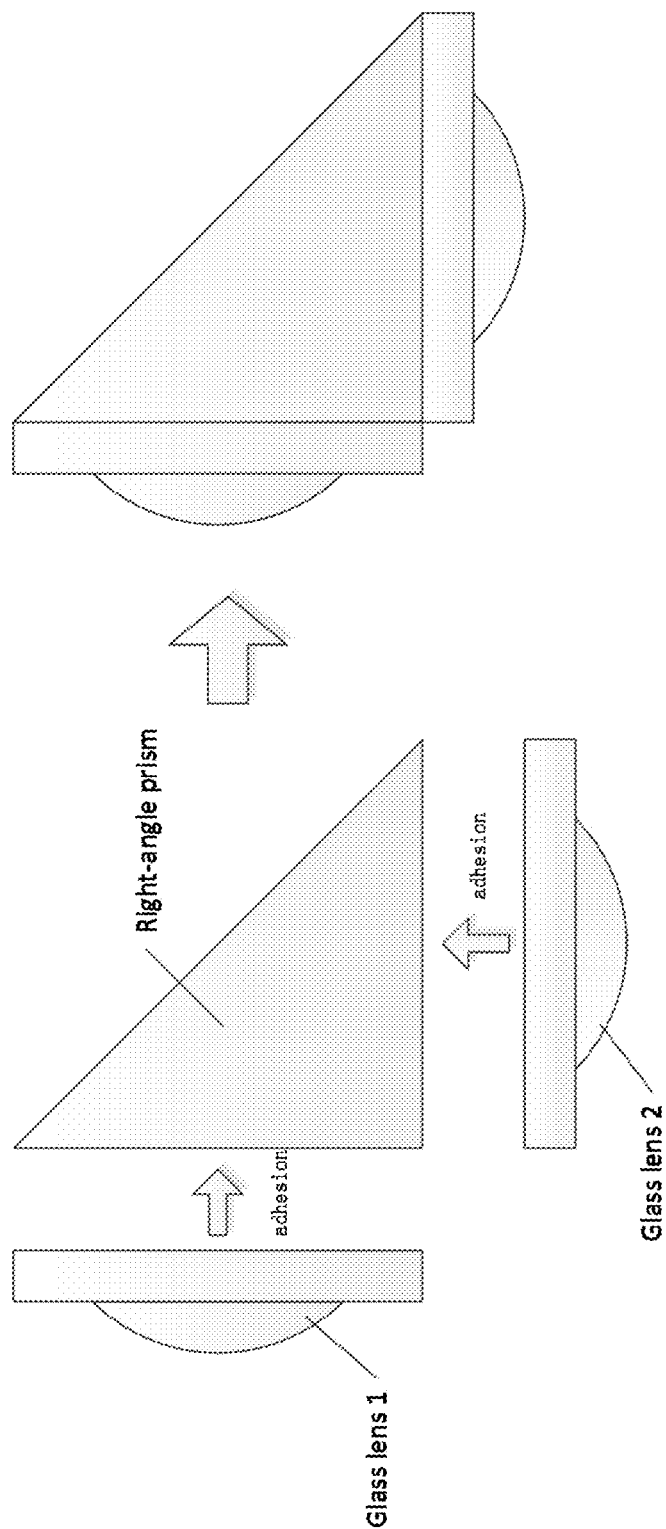
FIG. 13 is a diagram of a conventional optical coupling device with two glass lenses adhered to a right-angle glass prism.
Figure 14:
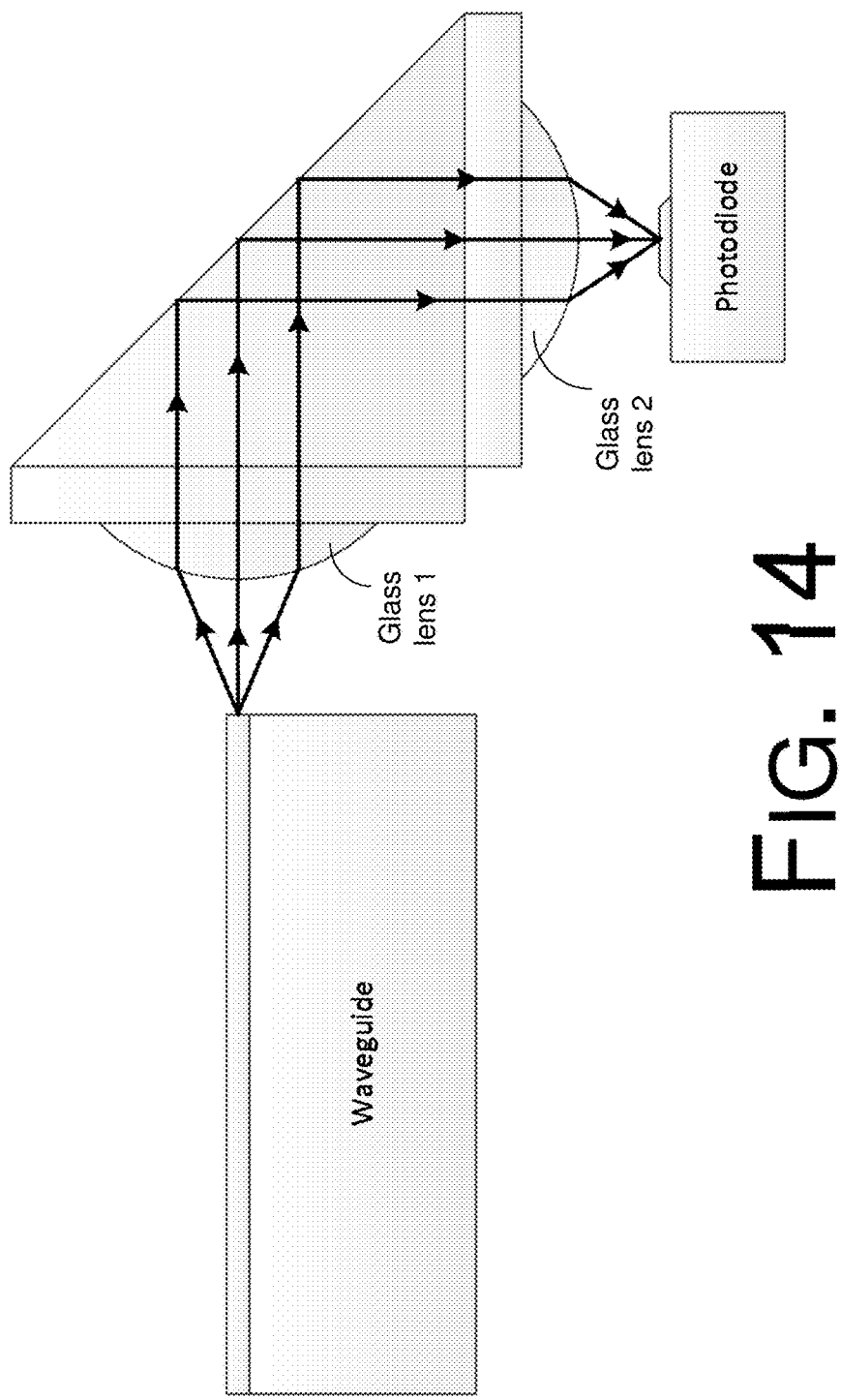
FIG. 14 is a diagram for functional description of the conventional optical coupling device of FIG. 13.

FIG. 12 illustrates a novel lens-integrated thin film filter 1200 for Mux/DeMux based on wafer-bonding technology and wafer-level nano-imprinting technology in accordance with the present disclosure. Referring to FIG. 12, the thin film filter 1200 may be formed by stacking four glass substrates coated with four different band-reflection filters together, which may be also integrated with lens based on wafer-level nano-imprinting technology.

Highlight of Select Features

In one aspect, an integrated optical coupling device may include a substrate, a coating layer disposed on the substrate, and a prism disposed on the coating layer. The prism may include a first surface and a second surface. The integrated optical coupling device may also include a first lens disposed on the first surface of the prism, a second lens disposed on the second surface of the prism, and an anti-reflection coating layer disposed on the first lens and the second lens.

In some implementations, the substrate may include one of a glass substrate, a silicon substrate, a silicon-on-insulator substrate, a silica substrate, a sapphire substrate, a gallium-arsenide substrate, or an indium-phosphide substrate.

In some implementations, the substrate may include a single-polished substrate.

In some implementations, the coating layer may include a reflection coating layer.

In some implementations, the reflection coating layer may include a metal film, a dielectric film, a multilayer dielectric film, or a combination of metal films and dielectric films.

In some implementations, a material of the prism, the first lens and the second lens may include polymer, polyimide, epoxy, resin, or a combination thereof.

In some implementations, the prism may include a right-angle prism having a right-angle disposed directly facing the coating layer.

In some implementations, the right-angle prism may include an equicrural right-angle prism.

In some implementations, the first lens may be disposed on a first side of the right-angle, and the second lens may be disposed on a second side of the right-angle.

In some implementations, the first lens may include an aspheric lens.

In some implementations, the second lens may include an aspheric lens.

In some implementations, an optical axis of the first lens and an optical axis of the second lens may be mirror-symmetrical with respect to a normal line of the coating layer.

In some implementations, the anti-reflection layer may include a single-layer dielectric film or a multilayer dielectric film.

In one aspect, an imprinting method for forming an integrated optical coupling device on wafer level may include: providing a substrate, with a reflection coating disposed thereon; providing an imprinting mold, with void regions shaped according to a designed lens profile; forming a molding material on the substrate; pressing the imprinting mold on the molding material on the substrate; curing the molding material; removing the imprinting mold; depositing an anti-reflection film on the cured molding material; and dicing to form an integrated optical coupling device.

In some implementations, the substrate may include a glass substrate, a silicon substrate, a silicon-on-insulator substrate, a silica substrate, a sapphire substrate, a gallium-arsenide substrate, or an indium-phosphide substrate.

In some implementations, a material of the imprinting mold may include silicon, tungsten carbide, silicon carbide, silicon nitride, titanium carbide, tungsten-cobalt alloy carbide, sapphire, or a combination thereof.

In some implementations, a material of the molding material may include polymer, resin, polyimide, epoxy, or a combination thereof.

In some implementations, the curing of the molding material may include thermal curing or ultraviolet (UV) curing.

In some implementations, the imprinting method may further include an extra patterning and dry etching process that defines isolation trenches between adjacent lenses.

In one aspect, an integrated optical coupling device may include a double-polished substrate having a first polished surface and a second polished surface opposite the first polished surface, a first coating layer disposed on the first polished surface of the substrate, and a first prism disposed on the first coating layer. The first prism may include a first surface and a second surface. The integrated optical coupling device may also include a first lens disposed on the first surface of the first prism, a second lens disposed on the second surface of the first prism, a first anti-reflection coating layer disposed on the first lens and the second lens, a second coating layer disposed on the second polished surface of the substrate, and a second prism disposed on the second coating layer. The second prism may include a first surface and a second surface. The integrated optical coupling device may further include a third lens disposed on the first surface of the second prism, a fourth lens disposed on the second surface of the second prism, and a second anti-reflection coating layer disposed on the third lens and the fourth lens.

In some implementations, the double-polished substrate may include a glass substrate, a silicon substrate, a silicon-on-insulator substrate, a silica substrate, a sapphire substrate, a gallium-arsenide substrate, or an indium-phosphide substrate.

In some implementations, the first coating layer may include a partial-transparent partial-reflecting coating layer, and the second coating layer may include an anti-reflection coating layer.

In some implementations, the first coating layer may include an anti-reflection coating layer, and the second coating layer may include a partial-transparent partial-reflecting coating layer.

In some implementations, a reflection ratio of the partial-transparent partial-reflecting coating layer may be 50%.

In some implementations, the first coating layer and the second coating layer may include single-layer dielectric films or multilayer dielectric films.

In some implementations, a material of the first prism, the second prism, the first lens, the second lens, the third lens and the fourth lens may include polymer, polyimide, epoxy, resin, or a combination thereof.

In some implementations, the first prism and the second prism may include right-angle prisms each of which having a right-angle disposed directly facing the coating layer.

In some implementations, the right-angle prism may include an equicrural right-angle prism.

In some implementations, the first lens and the second lens may be disposed on a first side and a second side of the right-angle of the first prism, respectively, and the third lens and the fourth lens may be disposed on a first side and a second side of the right angle of the second prism, respectively.

In some implementations, the first lens may include an aspheric lens.

In some implementations, the second lens may include an aspheric lens.

In some implementations, the third lens may include an aspheric lens.

In some implementations, the fourth lens may include an aspheric lens.

In some implementations, an optical axis of the first lens and an optical axis of the second lens may be mirror-symmetrical with respect to a normal line of the substrate.

In some implementations, an optical axis of the third lens and an optical axis of the fourth lens may be mirror-symmetrical with respect to a normal line of the substrate.

In some implementations, the first lens and the third lens may share a common optical axis.

In some implementations, the second lens and the fourth lens may share a common optical axis.

In some implementations, the first anti-reflection layer and the second anti-reflection layer may include single-layer dielectric films or multilayer dielectric films.

In one aspect, an imprinting method for forming an integrated optical coupling device on wafer level may include: providing a double-polished substrate, the double-polished substrate having a first surface and a second surface opposite the first surface; forming a partial-transparent partial-reflecting layer on the first surface of the substrate; forming an anti-reflection layer on the second surface of the substrate; providing a first imprinting mold with voids regions shaped according to a designed lens profile; providing a second imprinting mold with void regions shaped according to the designed lens profile; forming a first molding material on the first polished surface of the substrate with the partial-transparent partial reflecting layer; pressing the first imprinting mold on the first molding material on the substrate; curing the first molding material; removing the first imprint mold; depositing a first anti-reflection film on the cured first molding material; flipping the substrate; forming a second molding material on the second surface of the substrate with the anti-reflection layer; pressing the second imprinting mold on the second molding material on the substrate; curing the second molding material; removing the second imprinting mold; depositing a second anti-reflection film on the cured second molding material; and dicing to form an integrated optical coupling device.

In some implementations, the double-polished substrate may include a glass substrate, a silicon substrate, a silicon-on-insulator substrate, a silica substrate, a sapphire substrate, a gallium-arsenide substrate, or an indium-phosphide substrate.

In some implementations, a material of the first imprinting mold and second imprinting mode may include silicon, tungsten carbide, silicon carbide, silicon nitride, titanium carbide, tungsten-cobalt alloy carbide, sapphire, or a combination thereof.

In some implementations, a material of the first molding material and second molding material may include polymer, resin, polyimide, epoxy, or a combination thereof.

In some implementations, the curing of the first molding material may include thermal curing or UV curing.

In some implementations, the curing of the second molding material may include thermal curing or UV curing.

In one aspect, an integrated optical multiplexing/de-multiplexing (Mux/DeMux) device may include a double-polished substrate, an anti-reflection film, a first filter, a second filter, a third filter, and a fourth filter. The first filter may be a band-pass multilayer coating film for a first wavelength. The second filter may be a band-pass multilayer coating film for a second wavelength. The third filter may be a band-pass multilayer coating film for a third wavelength. The fourth filter may be a band-pass multilayer coating film for a fourth wavelength. The integrated optical Mux/DeMux device may also include a first lens disposed on the first filter, a second lens disposed on the second filter, a third lens disposed on the third filter, and a fourth lens disposed on the fourth filter.

In some implementations, the anti-reflection film may include an input port configured to receive lights of four wavelengths. The first lens, the second lens, the third lens and the fourth lens may include output ports configured to output a single-wavelength light respectively.

In some implementations, the first lens, the second lens, the third lens and the fourth lens may include input ports configured to receive lights of four different wavelengths respectively. The anti-reflection film may include an output port configured to output a multiplexed four-wavelength light.

In some implementations, the double-polished substrate may include a glass substrate, a silicon substrate, a silicon-on-insulator substrate, a silica substrate, a sapphire substrate, a gallium-arsenide substrate, or an indium-phosphide substrate.

In some implementations, the anti-reflection coating, the first lens, the second lens, the third lens and the fourth lens may be on a same side of the substrate.

In some implementations, the first lens, the second lens, the third lens and the fourth lens may be on a same side of the substrate. The anti-reflection coating may be on an opposite side of the substrate.

In some implementations, the first lens, the second lens, the third lens and the fourth lens may include aspheric lenses.

In some implementations, an optical axes of the first lens, an optical axes of the second lens, an optical axes of the third lens and an optical axes of the fourth lens may be in a propagation direction of lights of four wavelengths, respectively.

In some implementations, the first lens, the second lens, the third lens and the fourth lens may be each coated with an anti-reflection coating.

In some implementations, a material of the first lens, the second lens, the third lens and the fourth lens may include polymer, polyimide, epoxy, resin, or a combination thereof.

In some implementations, a fabrication method of the first lens, the second lens, the third lens and the fourth lens may include nano-imprinting.

In some implementations, an incident angle of a light may be larger than a Brewster angle of a material of the substrate.

In some implementations, at least one of the first lens, the second lens, the third lens, or the fourth lens may be integrated and disposed on the anti-reflection film.

In one aspect, an integrated optical Mux/DeMux device may include a first substrate layer, a second substrate layer, a third substrate layer, a fourth substrate layer, and an anti-reflection layer disposed on a top surface of the first substrate layer. The first substrate layer may be a double-polished substrate. The second substrate layer may be a double-polished substrate. The third substrate layer may be a double-polished substrate. The fourth substrate layer may be a double-polished substrate. The integrated optical Mux/DeMux device may also include a first filter, a second filter, a third filter, a fourth filter, and a lens array. The first filter may be a band-reflection multilayer coating film for a first wavelength, disposed between the first substrate layer and the second substrate layer. The second filter may be a band-reflection multilayer coating film for a second wavelength, disposed between the second substrate layer and the third substrate layer. The third filter may be a band-reflection multilayer coating film for a third wavelength, disposed between the third substrate layer and the fourth substrate layer. The fourth filter may be a band-reflection multilayer coating film for a fourth wavelength, disposed on a bottom surface of the fourth substrate layer. The lens array may be disposed on the anti-reflection layer.

In some implementations, each of the first substrate layer, the second substrate layer, the third substrate layer and the four substrate layer respectively may include a glass substrate, a silicon substrate, a silicon-on-insulator substrate, a silica substrate, a sapphire substrate, a gallium-arsenide substrate, or an indium-phosphide substrate.

In some implementations, the first substrate layer, the second substrate layer, the third substrate layer and the fourth substrate layer may be bonded together by wafer-bonding.

In some implementations, a material of the lens array may include polymer, polyimide, epoxy, resin, or a combination thereof.

In some implementations, a fabrication method of the lens array may include nano-imprinting.

In some implementations, the first lens, the second lens, the third lens and the fourth lens may include aspheric lenses.

In some implementations, optical axes of the lens array may be in a propagation direction of lights of four wavelengths, respectively.

Additional Notes

Although some embodiments are disclosed above, they are not intended to limit the scope of the present disclosure. It will be apparent to those skilled in the art that various modifications and variations can be made to the disclosed embodiments of the present disclosure without departing from the scope or spirit of the present disclosure. In view of the foregoing, the scope of the present disclosure shall be defined by the following claims and their equivalents.

What is claimed is:

1. An integrated optical coupling apparatus, comprising:
   a substrate of a first material;
   a first coating layer disposed on the substrate;
   a prism of a second material disposed on the coating layer, the prism having a first surface and a second surface;
   a first lens of the second material disposed on the first surface of the prism;
   a second lens of the second material disposed on the second surface of the prism; and
   an anti-reflection coating layer disposed on the first lens and the second lens,
   wherein the first material comprises one of glass, silicon, silicon-on-insulator, silica, sapphire, gallium-arsenide, or indium-phosphide, and wherein the substrate comprises a single-polished substrate,
   wherein the first lens comprises an aspheric lens, and wherein the second lens comprises an aspheric lens.

2. The apparatus of claim 1, wherein the substrate comprises a single-polished substrate.

3. The apparatus of claim 1, wherein the first coating layer comprises a reflection coating layer, and wherein the reflection coating layer comprises a metal film, a dielectric film, a multilayer dielectric film, or a combination of metal films and dielectric films.

4. The apparatus of claim 1, wherein the second material of the prism, the first lens and the second lens comprises polymer, polyimide, epoxy, resin, or a combination thereof, and wherein the second material is ultra-violet (UV) curable or thermal curable.

5. The apparatus of claim 1, wherein the prism comprises a right-angle prism having a right-angle disposed directly facing the coating layer, wherein the right-angle prism comprises an equicrural right-angle prism, and wherein the first lens is disposed on a first side of the right-angle, and wherein the second lens is disposed on a second side of the right-angle.

6. The apparatus of claim 1, wherein an optical axis of the first lens and an optical axis of the second lens are mirror-symmetrical with respect to a normal line of the coating layer.

7. An integrated optical coupling apparatus, comprising:
   a double-polished substrate of a first material having a first polished surface and a second polished surface opposite the first polished surface;
   a first coating layer disposed on the first polished surface of the substrate;
   a first prism of a second material disposed on the first coating layer, the first prism having a first surface and a second surface;
   a first lens of the second material disposed on the first surface of the first prism;
   a second lens of the second material disposed on the second surface of the first prism;
   a first anti-reflection coating layer disposed on the first lens and the second lens;
   a second coating layer disposed on the second polished surface of the substrate;
   a second prism of a third material disposed on the second coating layer, the second prism having a first surface and a second surface;
   a third lens of the third material disposed on the first surface of the second prism;
   a fourth lens of the third material disposed on the second surface of the second prism; and
   a second anti-reflection coating layer disposed on the third lens and the fourth lens.

8. The apparatus of claim 7, wherein the first material of the double-polished substrate comprises glass, silicon, silicon-on-insulator, silica, sapphire, gallium-arsenide, or indium-phosphide, wherein the first coating layer comprises a partial-transparent partial-reflecting coating layer, and wherein the second coating layer comprises an anti-reflection coating layer, and wherein the first coating layer comprises an anti-reflection coating layer, and wherein the second coating layer comprises a partial-transparent partial-reflecting coating layer.

9. The apparatus of claim 8, wherein a reflection ratio of the partial-transparent partial-reflecting coating layer is 50%.

10. The apparatus of claim 7, wherein the second material of the first prism, the first lens and the second lens comprises polymer, polyimide, epoxy, resin, or a combination thereof, and wherein the third material of the second prism, the third lens and the fourth lens comprises polymer, polyimide, epoxy, resin, or a combination thereof.

11. The apparatus of claim 7, wherein the first prism and the second prism comprise right-angle prisms each of which having a right-angle disposed directly facing the coating layer, wherein the right-angle prism comprises an equicrural right-angle prism.

12. The apparatus of claim 11, wherein the first lens and the second lens are disposed on a first side and a second side of the right-angle of the first prism, respectively, and wherein the third lens and the fourth lens are disposed on a first side and a second side of the right angle of the second prism, respectively.

13. The apparatus of claim 7, wherein at least one of the first lens, the second lens, the third lens and the fourth lens comprises an aspheric lens, wherein an optical axis of the first lens and an optical axis of the second lens are mirror-symmetrical with respect to a normal line of the coating layer, wherein an optical axis of the third lens and an optical axis of the fourth lens are mirror-symmetrical with respect to a normal line of the substrate, wherein the first lens and the third lens share a same common optical axis, and wherein the second lens and the fourth lens share a same common optical axis.

* * * * *